United States Patent
Chen

(10) Patent No.: US 6,762,931 B2
(45) Date of Patent: Jul. 13, 2004

(54) NOTEBOOK COMPUTER WITH A KEYBOARD WITH ADJUSTABLE ANGLES

(75) Inventor: Jung Hung Chen, Keelung (TW)

(73) Assignee: MITAC Technology Corp., Hsinchu (TW)

( * ) Notice: Subject to any disclaimer, the term of this patent is extended or adjusted under 35 U.S.C. 154(b) by 0 days.

(21) Appl. No.: 10/199,431

(22) Filed: Jul. 18, 2002

(65) Prior Publication Data

US 2004/0012919 A1 Jan. 22, 2004

(51) Int. Cl.⁷ .................................................. G06F 1/16
(52) U.S. Cl. ........................ 361/683; 361/680; 400/688; 400/691; 292/163
(58) Field of Search ................................. 361/680, 683, 361/679; 400/682, 688, 689, 691, 692, 693; 292/163

(56) References Cited

U.S. PATENT DOCUMENTS

| | | | | | |
|---|---|---|---|---|---|
| 5,168,427 | A | * | 12/1992 | Clancy et al. | 361/680 |
| 5,490,037 | A | * | 2/1996 | Clancy | 361/680 |
| 5,754,395 | A | * | 5/1998 | Hsu et al. | 361/680 |
| 5,764,474 | A | * | 6/1998 | Youens | 361/680 |
| 6,175,492 | B1 | * | 1/2001 | Nobuchi | 361/680 |

* cited by examiner

*Primary Examiner*—Lisa Lea-Edmonds
(74) *Attorney, Agent, or Firm*—Merchant & Gould, P.C.

(57) ABSTRACT

A notebook computer with a keyboard of adjustable angles has an independent keyboard module that has a bottom end pivotally engaged with a housing chamber of the main body. When in use, the keyboard module may be turned about the pivotal axis relative to the main body to a desired angle for use. Thus the keyboard can conform to ergonomics and alleviate fatigue in user's hands.

2 Claims, 6 Drawing Sheets

NOTEBOOK COMPUTER WITH A KEYBOARD WITH ADJUSTABLE ANGLES

FIELD OF THE INVENTION

The invention generally relates to a notebook computer, and particularly relates to a notebook computer that has a keyboard with a bottom end pivotally engaging with the main body such that the keyboard can be turned upwards about the pivotal axis to a selected angle to facilitate user operations.

BACKGROUND OF THE INVENTION

With thriving developments of computers these days, portable computers have become essential working and business tools for many people. Computer manufacturers have constantly reduced the size of portable computers. Now many portable computers are reduced to the size of notebooks and are almost as powerful as desktop computers. These notebook computers can be carried in attache cases or handbags to meet the requirements of business people anytime anywhere.

The biggest difference between notebook computers and desktop computers is their display devices. The display device on a notebook computer has to be small, light, thin and consume less electric power. Its manufacturing technology is much more complex than conventional display devices which use cathode ray tubes. In order to reduce costs, notebook computers generally are equipped with passive matrix type color display devices or active matrix type color display devices. The power supply for notebook computers is generally NiMH or NiCd batteries. High-end models can be coupled with Li-ion batteries, which have longer service time and no memory loss effect. Some types of batteries can last three to four hours. A few types can even last up to ten hours. For business people who have to travel frequently, those notebook computers offer great value as they can work when traveling.

In order to make notebook computers more convenient, most notebook computers have keyboards directly installed on the notebook computer main body. The keyboards thus constructed cannot be adjusted to a desired angle for use. As a result, their designs are not ergonomic for human operations, and tend to make people's hands become fatigued easily.

SUMMARY OF THE INVENTION

In view of aforesaid disadvantages, the primary object of the invention is to provide a notebook computer with a keyboard of adjustable angles to conform to ergonomics and alleviate fatigue in users' hands during operation.

The notebook computer with a keyboard of adjustable angles according to the invention includes a notebook computer main body and a keyboard module. The notebook computer main body has a housing chamber for holding the keyboard module. The keyboard module is electrically connected to the notebook computer main body. The keyboard module has a bottom end pivotally engaged with the housing chamber. In normal conditions, the keyboard module is laid flat in the housing chamber. When in use, the keyboard module may be turned about the pivotal axis relative to the notebook computer main body until reaching a desired angle to conform to ergonomics and to avoid burdening a user's hands during operation.

On the other hand, the top end of the keyboard module may attach to an angle adjustment element, which is inserted into a matching location in the housing chamber for adjusting the angle of the keyboard module. The angle adjustment element may be a gear rack coupling with a gear, or an arch-shaped slot coupling with a set-screw for adjusting the angle.

The foregoing, as well as additional objects, features and advantages of the invention will be more readily apparent from the following detailed description, which proceeds with reference to the accompanying drawings. The drawings are only to serve for reference and illustrative purposes, and are not intended to limit the scope of the invention.

DESCRIPTION OF THE PREFERRED EMBODIMENTS

Figure 1A:
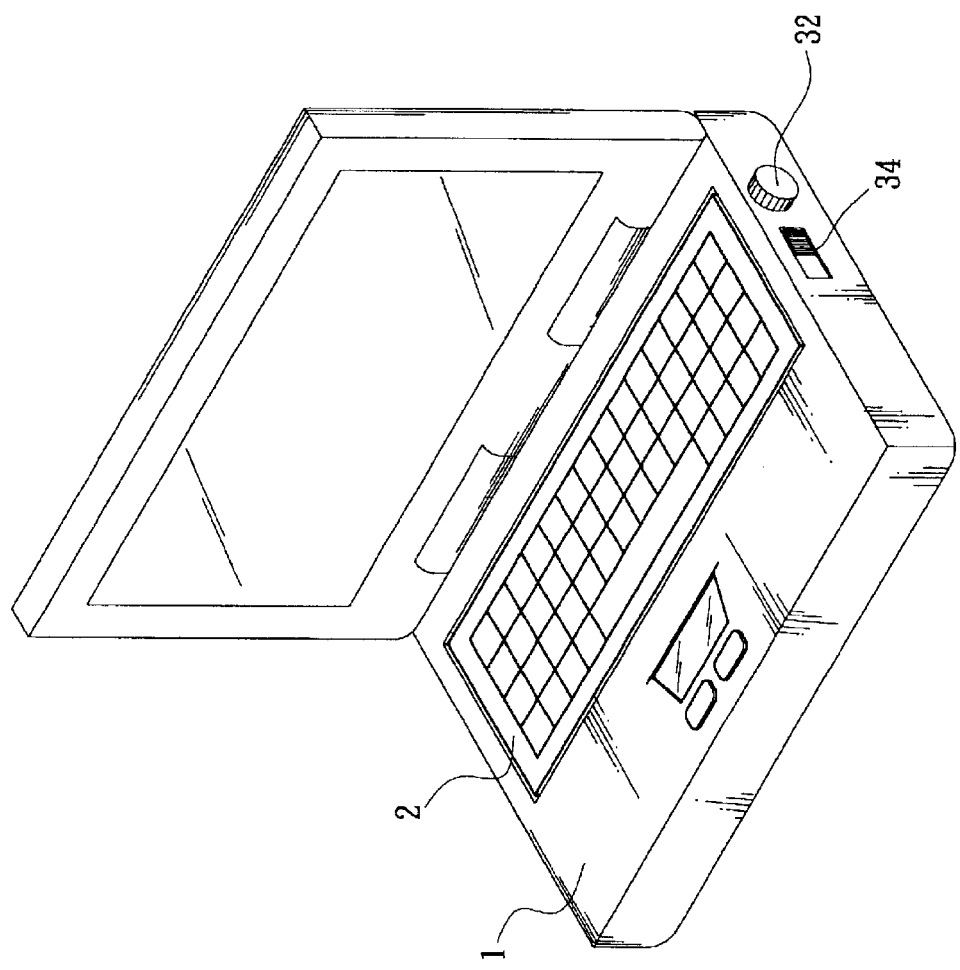
FIGS. 1A and 1B are schematic views of the invention.
Figure 1B:
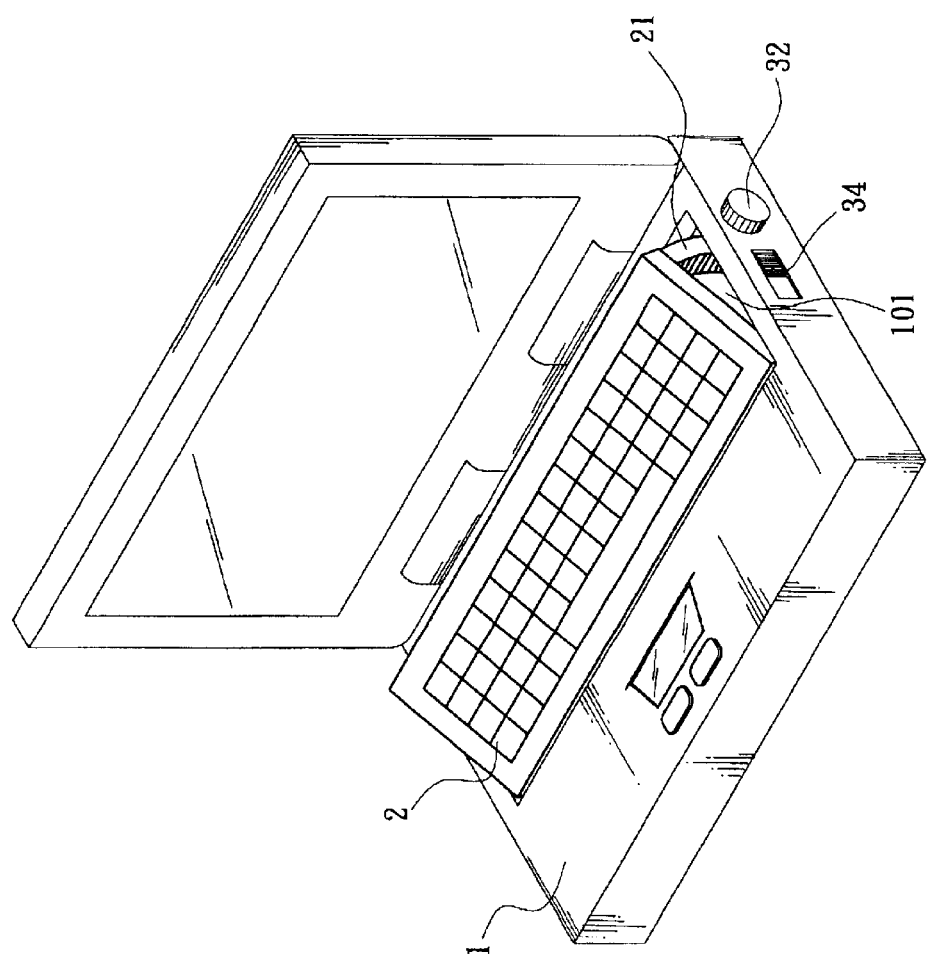

Referring to FIG. 1A, the notebook computer with a keyboard of adjustable angles according to the invention includes a notebook computer main body 1 and a keyboard module 2. The notebook computer main body 1 has a housing chamber 101 (shown in FIG. 1B) for holding the keyboard module 2. The keyboard module 2 and the notebook computer main body 1 are electrically connected (maybe through pivotal connecting locations, bottom side, or lateral sides). The keyboard module 2 has a bottom end pivotally engaged with the housing chamber 101. In normal conditions, the keyboard module 2 is laid flat in the housing chamber 101. When in use, there is an angle adjustment element 21 located on the top end of the keyboard module 2 that allows the keyboard module 2 to turn about the pivotal axis on the bottom end relative to the notebook computer main body 1. The top end of keyboard module 2 may then be lifted up to allow the keyboard module 2 to form a suitable angle (as shown in FIG. 1B) to facilitate user operations and alleviate the burden on a user's hands when operating for a long period of time.

Figure 2:
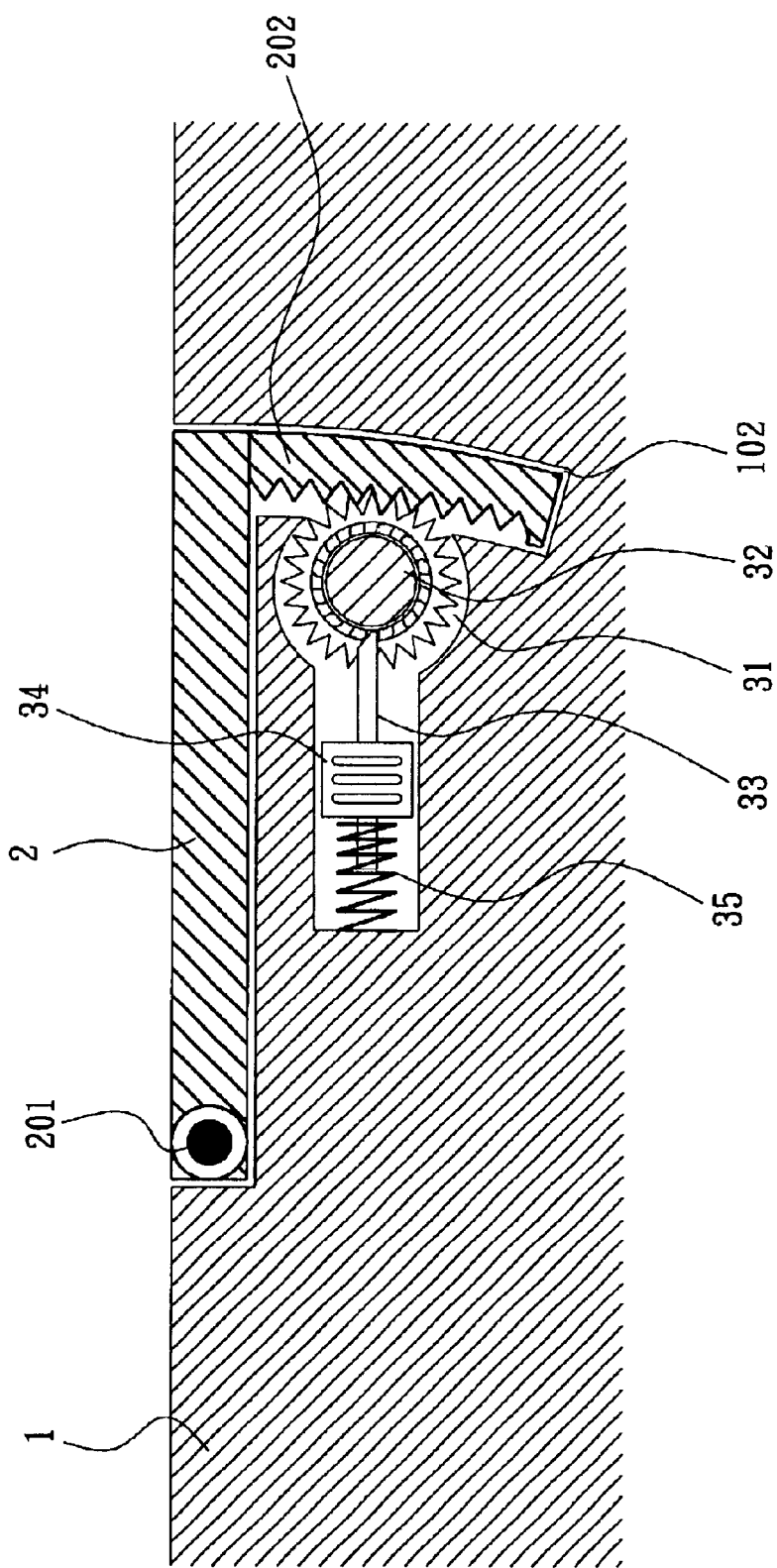
FIG. 2 is a schematic view of an angle adjustment element of the invention.
Figure 3:
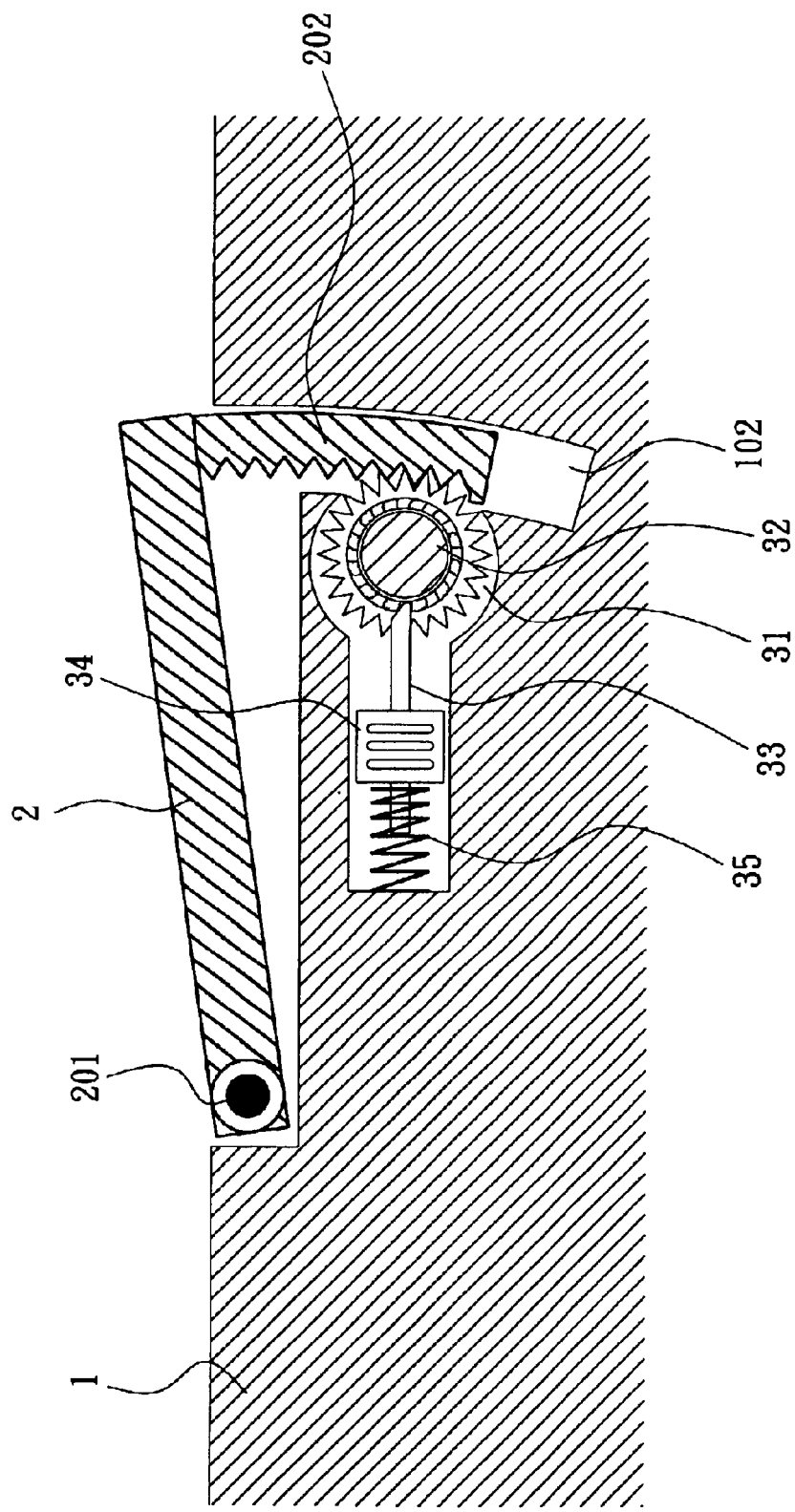
FIG. 3 is a schematic view of adjusting keyboard module angle according to the invention.

Referring to FIG. 2 for a first embodiment of the angle adjustment element 21, below the top end of the keyboard module 2 there is an arch-shaped gear rack 202 to engage with a gear 31. Behind the gear 31 there is a tenon 33 (of course other engaging means may also be used) to brake and anchor the turning angle of the gear 31. Behind the gear 31 there is an elastic element (such as a spring 35) to keep the gear in an anchored position. In normal conditions, the keyboard module 2 is held in the housing chamber 101 of the notebook computer main body 1, and the gear rack 202 is held in a corresponding cavity 102. When in use, there is an exposed turning knob 32 (as shown in FIG. 1A) connected to the gear 31 that may be turned counterclockwise to turn the gear 31 and drive the gear rack 202 upwards. Hence the keyboard module 2 may be turned about the pivotal axis 201 relative to the notebook computer main body 1 until reaching a desired angle for use. The tenon 33 may latch on the gear 31 to prevent the gear 31 from turning clockwise and prevent the keyboard module 2 from slipping down. The spring 35 behind the tenon 33 provides a force to keep the keyboard module 2 in the anchored condition, as shown in FIG. 3.

Figure 4:
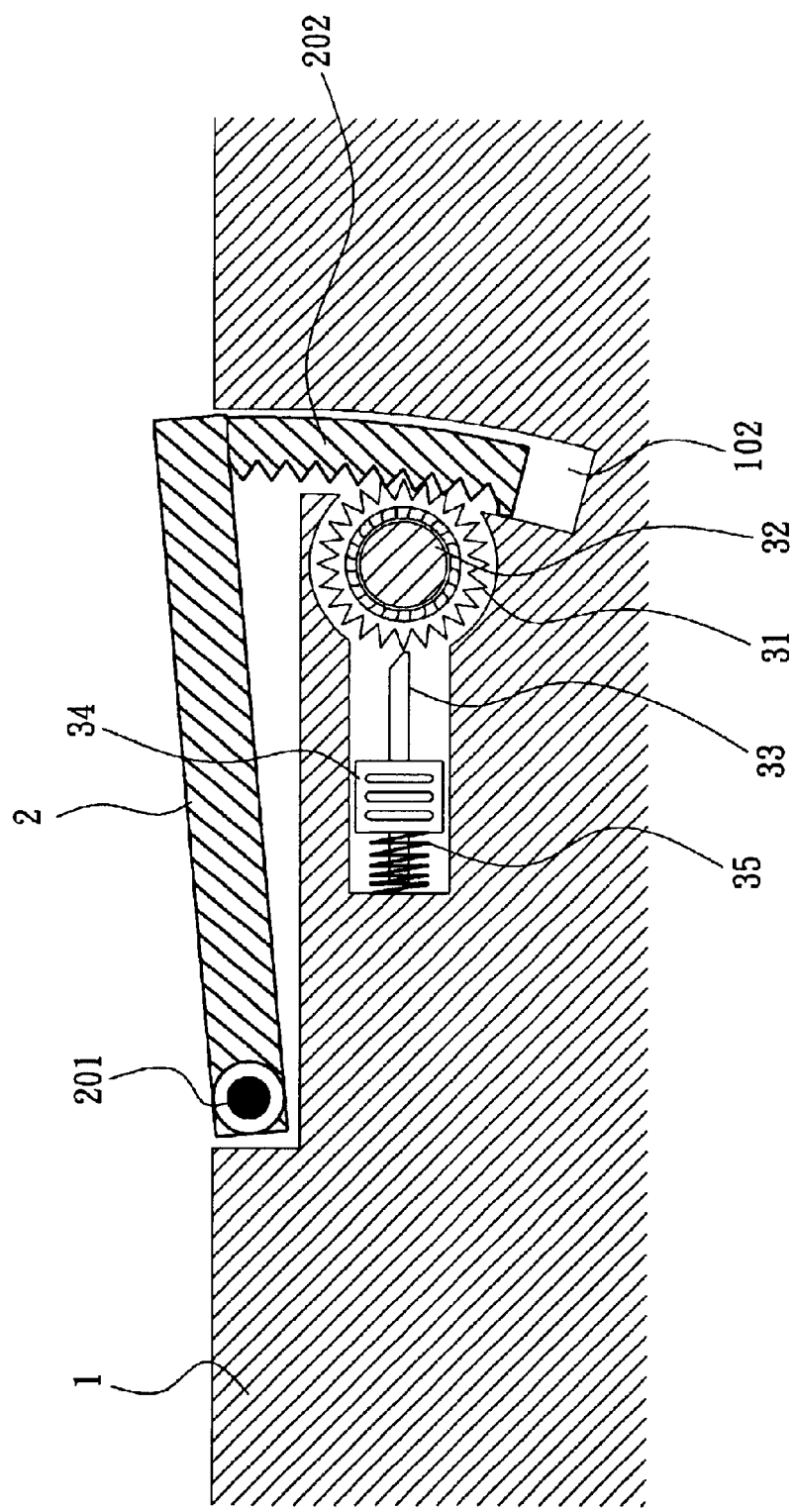
FIG. 4 is a schematic view of restoring keyboard module angle according to the invention.

In order to reinforce the anchoring condition when in use and prevent the raised keyboard module 2 from slipping down, the tenon 33 may be designed as a one-way tenon. For instance, in this embodiment, the tenon 33 may have a bias angle on the front end to latch in the teeth of the gear 31 and prevent the gear 31 from turning the keyboard module 2 is to be stored, there is a switch 34 (as shown in FIG. 1A) located between the tenon 33 and spring 35 that may be pushed rearwards to compress the spring 35 for unlatching the tenon 33 from the gear 31 (as shown in FIG. 4). Then the knob 32 may be turned to drive the gear 31 clockwise and lower the keyboard module 2 to an idle position. Similar procedures may be used to decrease the angle.

Figure 5:
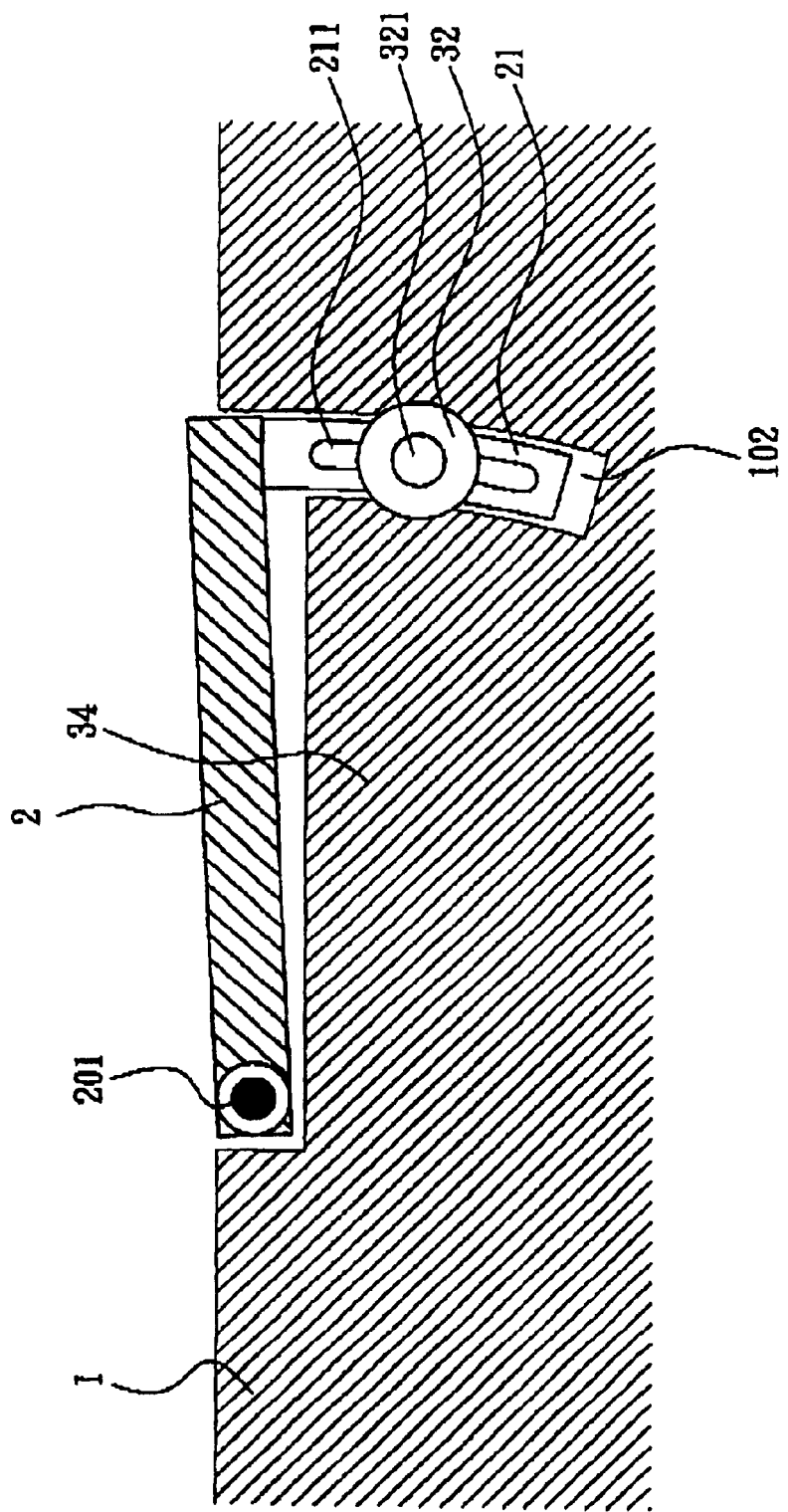
FIG. 5 is a schematic view of another embodiment of the angle adjustment element of the invention.

Referring to FIG. 5 for a second embodiment of the invention, the angle adjustment element 21 has an arched slot 211 to couple with an anchor element 321 (such as a screw) fastened to a turning knob 32. Then the keyboard module 2 may be achored at any angle desired. To facilitate turning of the keyboard module 2, the keyboard module 2 may have a bulgin side edge, or the side edge of the housing chamber 101 may have an indented groove formed thereon to couple with the turning knob 32. Then the turning knob 32 may be turned loose for lifting the keyboard module 2 to a desired angle, or it may be turned tight for anchoring the keyboard module 2 at the selected angle.

In summary, the invention can achieve the following functions:

The notebook computer with a keyboard of adjusting angles according to the invention has the bottom end of the keyboard section pivotally engaged with the notebook computer main body. In normal conditions, the keyboard module is laid flat in the housing chamber of the main body. When in use, the keyboard module may be turned about the pivotal axis relative to the notebook computer main body until reaching a desired angle to facilitate user operations to conform to ergonomics and to alleviate the burden from a user's hands during operation.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A notebook computer with a keyboard of adjustable angles, comprising:

a notebook computer main body having a housing chamber; and a keyboard module having a bottom end pivotally engaging with the housing chamber on a pivotal axis, a top end connecting an angle adjustment element and forming an electric connection with the notebook computer main body;

wherein said angle adjustment element includes,
an arch-shaped gear rack coupling with a gear located below the housing chamber for adjusting the keyboard module at a selected angle,
a one-way tenon located behind said gear, wherein said one-way tenon anchors said gear at said selected angle, prevents said keyboard module from slipping downwards from said selected angle, and when said one-way tenon is released the selected angle may be decreased, and
an elastic element behind said one-way tenon for restoring the tenon to the anchoring position;

wherein the keyboard module is flatly laid in the housing chamber in normal conditions and when in use the top end of the keyboard module is adjustable to a desired elevation through the angle adjustment element by turning the keyboard module about the pivotal axis relative to the housing chamber to facilitate user operations.

2. The notebook computer with a keyboard of adjustable angles of claim 1, wherein the elastic element is a spring.

* * * * *